United States Patent [19]

Possati

[11] 4,233,744
[45] Nov. 18, 1980

[54] APPARATUS FOR THE GEOMETRICAL CHECKING OF WORKPIECES HAVING SURFACES OF ROTATION

[75] Inventor: Mario Possati, Bologna, Italy

[73] Assignee: Finike Italiana Marposs S.p.A., S. Marino, Italy

[21] Appl. No.: 965,402

[22] Filed: Dec. 1, 1978

[51] Int. Cl.³ ............................................. G01B 7/14
[52] U.S. Cl. ............................. 33/143 L; 33/174 L; 33/174 PA; 33/178 E
[58] Field of Search ............ 33/174 L, 174 P, 174 Q, 33/178 R, 178 E, 143 R, 143 L, 174 PA, 169 B, 179.5 R, 179.5 A, 179.5 D, 143 M, 143 J, 143 K

[56] References Cited

U.S. PATENT DOCUMENTS

| 2,637,908 | 5/1953 | Hedman | 33/179.5 R |
| 4,084,322 | 4/1978 | Albertazzi | 33/174 L |

FOREIGN PATENT DOCUMENTS 557578 11/1943 United Kingdom .
564386 9/1944 United Kingdom .
948484 2/1964 United Kingdom .
981222 1/1965 United Kingdom .

*Primary Examiner*—Willis Little
*Attorney, Agent, or Firm*—Stevens, Davis, Miller & Mosher

[57] ABSTRACT

Apparatus for checking diameters and other geometrical features of workpieces having internal and or external surfaces of rotation including a base and a plate carried by the base and having a plurality of slots for supporting and adjusting the position of measuring heads. The measuring heads include feelers adapted to contact the workpiece to be checked. A plurality of measuring heads can be clamped in each slot. The slots are parallel to one another and their axes are arranged side by side in a direction perpendicular to a geometrical plane in which the feelers of the measuring heads lie. The base supports a nosepiece providing a mechanical reference for the workpiece to be checked.

12 Claims, 4 Drawing Figures

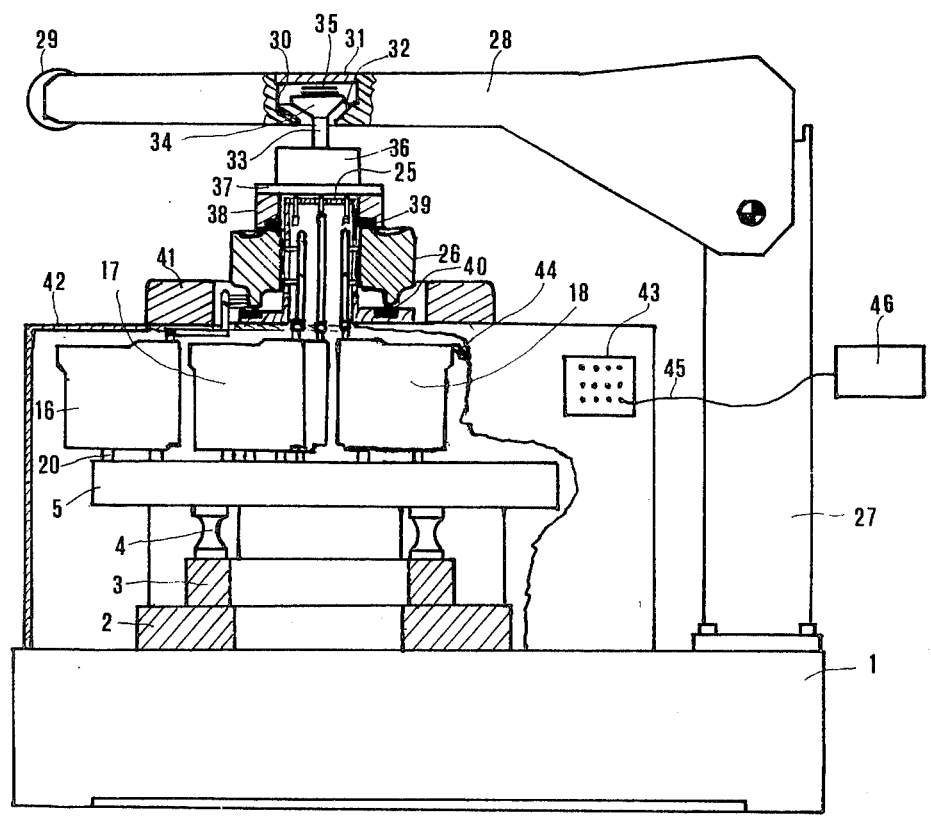
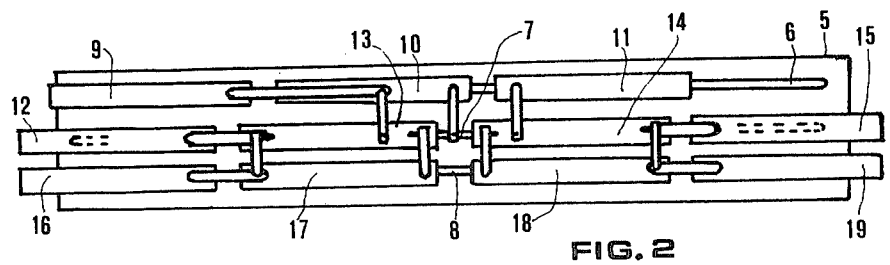
FIG.1
FIG.2

APPARATUS FOR THE GEOMETRICAL CHECKING OF WORKPIECES HAVING SURFACES OF ROTATION

The present invention relates to an apparatus for the geometrical checking of workpieces having at least one surface of rotation with respect to a geometrical axis, including a base, workpiece support and mechanical reference means mounted on the base, measuring heads with feeler elements adapted to co-operate with the surface of rotation for checking dimensions in a diametral direction, means for supporting and adjusting the position of the measuring heads carried by the base, and indications means connected to the measuring heads, and in which the feeler elements of the heads lie in a plane passing through said axis.

In order to check accurately and rapidly the geometrical characteristics of workpieces when using heads for linear dimensions checks, it is essential to employ, apart from the heads, mechanical workpiece reference means (which, for example, in the case of a workpiece with surfaces of rotation, can determine with sufficient accuracy the geometric rotation axis) and devices to support the measuring heads in a positions suitable for performing the check.

The design of an apparatus for checking a certain type of workpiece may give rise to mechanical structures and other characteristics differing considerably, depending on whether it is based on the manufacture of the elements of the apparatus with strict reference to a determined type of workpiece, or the manufacture of standardized parts suitable for realizing apparatuses capable of checking workpieces even considerably different from one another.

In the first case the apparatuses are normally extremely accurate and reliable, but their component parts have high production costs and are by no means versatile for use.

In the second case, i.e. when apparatuses are manufactured by using suitably standardized elements, such as support plates, brackets, transmission levers, guides, etc., often the design and the assembly are rather complicated and require specifically trained personnel, the mechanical structures are quite fragile and subject to deformation and consequently, also owing to the presence of a considerable number of transmissions, measurement accuracy and repeatability are frequently rather poor.

An object of the invention is to realize an apparatus for the geometrical checking of workpieces with surfaces of rotation that will consist of a large number of standardized elements, that is suitable for checking workpieces quite different from one another, requiring limited time and costs for its fitting and that will guarantee a high level of accuracy and repeatability.

A further object of the invention is to provide an apparatus of the type mentioned that can simultaneously check various inside and outside dimensions of a same workpiece, even when the workpiece is rotating.

These and other objects and advantages are obtained through an apparatus wherein, according to the invention, the means for supporting and adjusting include a plurality of guides placed beside one another in an established direction, each guide being adapted to support an associated group of the measuring heads and enabling the displacement of the associated heads according to an axis perpendicular to the geometrical axis, the feeler elements of the measuring heads remaining—during the displacement—in the said plane, the established direction being perpendicular to this plane.

BRIEF DESCRIPTION OF THE DRAWINGS

FIG. 1 is an assembly side view, partially cross-sectional, of an apparatus according to a preferred embodiment of the invention;

FIG. 2 is a plan view, enlarged with respect to FIG. 1, of a support and positioning plate of the measuring heads of the apparatus shown in FIG. 1;

DETAILED DESCRIPTION OF THE INVENTION

Figure 3:
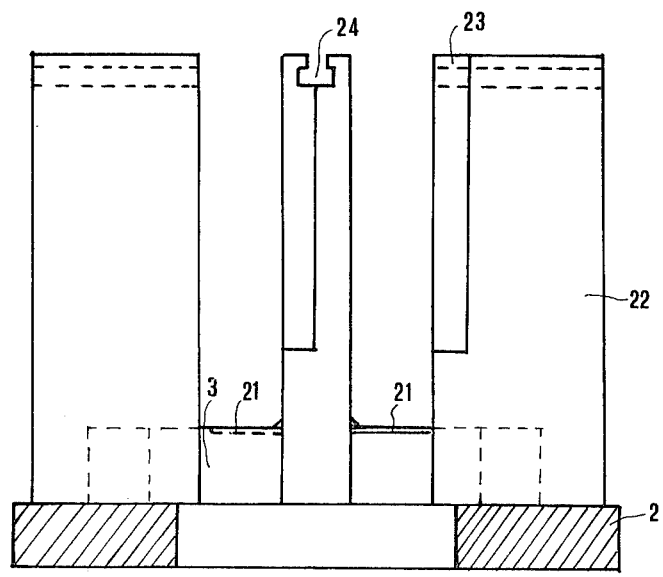
FIG. 3 shows a section according to path III—III in FIG. 4 of a support structure of the apparatus shown in the previous figures, viewing the apparatus in a direction at 45° with respect to the plane of FIG. 1 and enlarged with respect to FIG. 1.

The apparatus shown in FIG. 1 includes a base 1 whereupon there is fixed a ring shaped support 2. Another ring shaped support 3, fixed to support 2, supports by means of three connection elements 4, only two of which can be seen, a plate or beam 5 having a rectangular plan.

Plate 5 (FIG. 2) has three guide slots 6, 7, 8 which enable a plurality of measuring heads to move along the direction of the longitudinal axis of plate 5.

In the specific case shown there are eleven measuring (gauging) heads 9–19. Heads 9–19 are clamped to plate 5 by means of connection screws 20 passing through slots 6, 7, 8.

Figure 4:
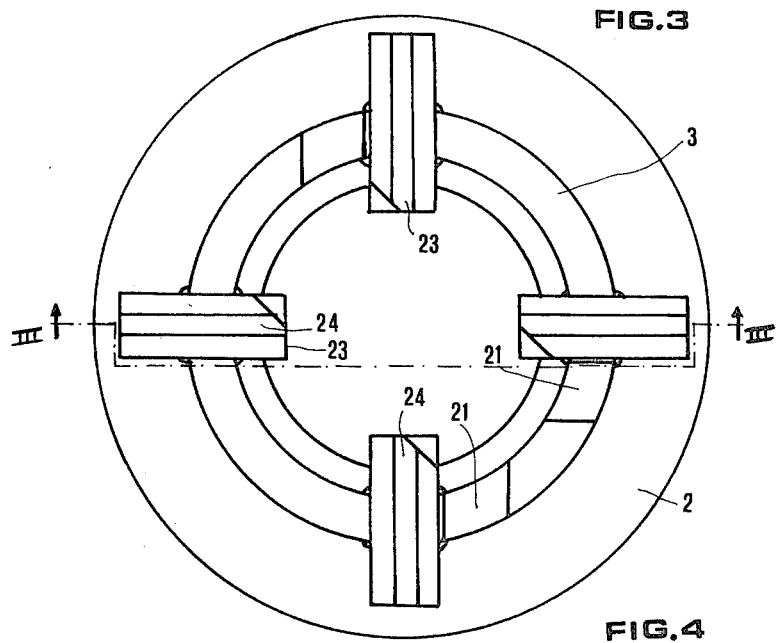
FIG. 4 is a plan view of the structure shown in FIG. 3.

The screw heads are accessible from the bottom of plate 5. The bases of connection elements 4 are housed in seats 21 of support 3 (FIGS. 3, 4).

Four stanchions 22, supported by supports 2, 3, end with horizontal rests 23 having relevant grooves 24.

The axes of grooves 24 are aligned two by two according to two perpendicular straight lines, forming 45 degree angles with the direction of the longitudinal axis of plate 5.

A nosepiece 25, clamped to grooves 24, ensures centering and provides a mechanical reference for workpiece 26, and it protects the fingers of the measuring heads 9, 10, 11, 13, 14, 17, 18, located within the nosepiece; the nosepiece has two opposed slits enabling the ends of said fingers to protrude.

Base 1 supports a stanchion 27 whereupon there is a pivoting arm 28 with a handle 29 at one of its ends.

In arm 28 there is a hole 30 closed at the top by a plate 31 and ending at the bottom with a tapered stop surface 32.

In hole 30 there is a mobile in 33 ending with a tapered section 34. A spring 35 is located between plate 31 and tapered section 34.

There is a small cylinder 36 having a plate 37 and clamped to pin 33 with axial adjustment means (not shown).

A ring 38 clamped to plate 37. Ring 38 has carbide inserts 39 contacting the upper part of workpiece 26 with a determined pressure. Workpiece 26 is supported by other carbide inserts 40 fixed to nosepiece 25.

A ring 41, located on an outer cover 42 is clamped to rests 23 (or to nosepiece 25), and acts as a protection for the feelers (contacts) and arms (fingers) of heads 12, 15, 16, 19, arranged at the exterior of nosepiece 25.

A terminal block 43 provides connection between its pins and cables of heads 9-19, only one of which, 44, is shown, and between the pins and cables, only one of which, 45, is shown, connected to a detection, processing and indication unit 46.

As it can be seen in FIG. 3, in each of slots 6, 7, 8 it is possible to place up to 4 measuring heads. The measuring heads of the apparatus shown are of three types: for checking outside diameters (heads 12, 15, 16, 19), for inside diameters (heads 13, 14, 17, 18) and for depth measurements (heads 9, 10, 11).

Moreover the heads differ from one another in so far as the shape of the fingers is concerned, which could have, for example, extensions parallel to guides 6, 7, 8; the shape of the fingers also depends on the arrangement of the cross-sections whereupon measurements are taken and also on the location of the heads.

The heads located in the external slots 6 and 8 have fingers including sections extending in a direction having a component perpendicular to the slots. In this way it is possible to ensure that all the measuring head feelers, i.e. contacts, are always in a vertical plane ("measurement plane") passing through the axis of the central slot 7 and through that of workpiece 26 (if nosepiece 25 is correctly centered with respect to plate 5 and workpiece 26 is correctly centered with respect to nosepiece 25).

This geometrical arrangement will guarantee that the two pairs of feelers of heads 13, 14 and 17, 18 are aligned along two inside diameters of workpiece 26 and the two pairs of feelers of heads 12, 15 and 16, 19 are aligned along two outside diameters.

As a matter of fact, by the arrangement shown in FIGS. 1 and 2 it is possible to check, while workpiece 26 is rotating, all the inside diameters in two sections, all the outside diameters in two other sections, and, by further processing the signals, other geometrical characteristics, thus detecting any possible ovality, concentricity, perpendicularity, etc. errors.

With regard to depth check, i.e.—in the case of the apparatus shown in the figures—the check of the height of workpiece 26, they are effected in an indirect manner by means of heads 9, 10, 11, according to the explanation given hereinafter.

The apparatus operation is the following.

Depending on the theoretical shape of workpiece 26 it is possible to determine the number of measuring heads, and the shape of the fingers of the heads.

Also ring 38, plate 37, nosepiece 25 and ring 41 are manufactured according to the characteristics of workpiece 26.

The zero setting of the measuring heads with respect to the axial dimensions (in order to bring the feelers to positions corresponding to the cross-sections where the various checks must be carried out) can be made even before the installation of the heads on plate 5, since the height of the rests 23 with respect to plate 5 is known.

The measuring heads used are preferably of a type having sensitivity independent from the length of the fingers, for example heads with a "parallelogram" movable arm-set.

Then the heads are installed in slots 6, 7, 8, and nosepiece 25 is placed on rests 23 centered and clamped.

For finding the correct location of nosepiece 25, the signals of two measuring heads (for example heads 17, 18) can be utilized, when a master workpiece is already applied to the nosepiece. Then the nosepiece is clamped in such a way that the measurement plane is a diametral plane.

Thereafter the measuring heads are coarsely zero set in a radial direction, by making them slide in slots 6, 7, 8, till the reading had approximately zero value.

Once the heads are clamped to plate 5, a fine electrical zero setting is carried out.

Lastly the working positions of plate 37 and of ring 38 are adjusted. Then it is possible to proceed with the checking of the series of workpieces 26.

Workpiece 26 to be checked is applied to nosepiece 25. By operating handle 29, arm 28 pivots lowering plate 37 with ring 38. While ring 38 is brought towards nosepiece 25 the tapered section 34 is in contact with tapered surface 32. This guarantees alignment of the axis of ring 38 with that of nosepiece 25 when inserts 39 are about to contact workpiece 26.

In this way there is also ensured correct insertion of nosepiece 25 in ring 38.

When inserts 39 contact the surface of workpiece 26, the tapered section 34 disengages from tapered surface 32 and inserts 39, thanks to the thrust of spring 35, are brought into stable contact with workpiece 26, with a suitable value of pressure.

The lower face of plate 37 takes a position parallel to the plane passing through the three points on workpiece 26, which are in contact with the inserts 39.

Thus it is evident that heads 9, 10, 11 provide signals depending on the distance of the plane defined by inserts 39 from the plane defined by inserts 40, in other terms signals indicative of the deviation of the workpiece height from its nominal height.

Workpiece 26 can be manually rotated, thus carrying out checks during rotation.

The connection elements 4 have a flexible section, in order to prevent transmitting to plate 5 stresses due to possible strains of base 1 or of supports 2, 3.

The opening and closing positions of arm 28, and possibly other intermediate positions are defined by suitable stops, not shown.

It is evident that most of the elements making up the apparatus can be standardized so that the apparatus can be used for checking different types of workpieces.

If the weight and geometrical characteristics of the workpiece to be checked are such as to ensure correct positioning with respect to the relevant nosepiece without the need of the thrust action provided by inserts 39 fixed to ring 38, and if it isn't necessary to carry out depth checks in an indirect way, as already described, the apparatus can be realized without stanchion 27, arm 28 and the parts supported by the latter.

Under particular circumstances it is possible to mount special measuring heads on plate 5. It is also possible, in a particular case, to have feelers acting out of the measuring plane previously described.

As another variant one can foresee the use of measuring heads mounted on one or more supports carried by arm 28.

It is obvious that the number of guide slots for the measuring heads, the maximum number of heads that can be housed in a slot, the inside minimum dimensions and the outside maximum checkable dimensions, etc., can have different values, depending on the design and on the field of application that one wishes to cover.

In any case, further to the advantages already evidenced, the apparatus provides the possibility of obtaining many measurement points with limited layout dimension requirements.

I claim:

1. An apparatus for the geometrical checking of workpieces having at least one surface of rotation with respect to a geometrical axis, including a base, workpiece support and mechanical reference means mounted on the base, measuring heads with feeler elements adapted to co-operate with the surface of rotation for checking dimensions in a diametral direction, means for supporting and adjusting the position of the measuring heads carried by the base, and indication means connected to the measuring heads, and in which the feeler elements of the heads lie in a plane passing through the geometrical axis, said means for supporting and adjusting include a plurality of guides placed beside one another in an established direction, each guide being adapted to support an associated group of said measuring heads and enabling the displacement of the associated heads according to an axis perpendicular to said geometrical axis, the feeler elements of the measuring heads remaining—during the displacement—in said plane, said established direction being perpendicular to this plane.

2. The apparatus according to claim 1, wherein the measuring heads for checking dimensions in diametral directions are supported by guides defining displacement axes external with respect to said plane and include movable fingers—supporting associated feelers—extending in directions having perpendicular components with respect to the relevant displacement axes, the feelers consisting of contacts for direct contact.

3. The apparatus according to claim 1, wherein said measuring heads comprise movable fingers carrying said feelers, said feelers being direct contact feelers, and said measuring heads being of the type with measurement sensitivity substantially independent from the finger length.

4. The apparatus according to claims 1, 2 or 3 wherein the plane in which the feelers lie is vertical and the axes of said guides define a horizontal plane.

5. The apparatus according to claim 4, wherein said means for supporting and adjusting comprise a horizontal plate and said guides include slots obtained in said plate.

6. The apparatus according to claim 5, wherein said measuring heads include connections screws for the coupling with the slots.

7. The apparatus according to claim 5, wherein said means for supporting and adjusting include three flexible connections located between said base and said plate and said support and mechanical reference means include resting devices supported by the base, for the positioning and clamping of said nosepiece.

8. The apparatus according to claim 7, wherein said resting devices include four vertical stanchions carrying associated horizontal supports aligned along two perpendicular axes, said plate being located between the stanchions and having a geometrical axis lying on said plane and placed at 45° with respect to said perpendicular axes.

9. An apparatus for the geometrical checking of workpieces defining a bore, an internal surface of rotation and an external surface of rotation with respect to a geometrical axis concentric to the bore, including a base, workpiece support and mechanical reference means mounted on the base, said support and mechanical reference means comprising a centering nosepiece suitable for insertion in the bore and enabling workpiece rotation around said geometrical axis, in order to carry out the geometrical check along the entire perimeter of cross-sections of said surfaces perpendicular to the geometrical axis, measuring heads with feeler elements adapted to cooperate with the surface of rotation for checking dimensions in a diametral direction, means for supporting and adjusting the position of the measuring heads carried by the base, and indication means connected to the measuring heads, and in which the feeler elements of the heads lie in a plane passing through the geometrical axis, said means for supporting and adjusting include a plurality of guides placed beside one another in an established direction, each guide being adapted to support an associated group of said measuring heads and enabling the displacement of the associated heads according to an axis perpendicular to said geometrical axis, the feeler elements of the measuring heads remaining—during the displacement—in said plane, said established direction being perpendicular to this plane.

10. The apparatus of claim 9, wherein the workpiece includes an upper plane surface, which includes a thrust and mobile reference device for co-operating with said upper plane surface of the workpiece placed on the nosepiece, adapting itself to the lying of said plane surface, to provide a workpiece settlement thrust.

11. The apparatus of claim 10, further comprising measuring heads for depth checking, these measuring heads being adapted to co-operate with said thrust and reference device for checking in an indirect way workpiece axial dimensions.

12. The apparatus according to claim 3, wherein the measuring heads for checking dimensions in diametral directions are supported by guides defining displacement axes external with respect to said plane and include movable fingers—supporting associated feelers—extending in directions having perpendicular components with respect to the relevant displacement axes, the feelers consisting of contacts for direct contact.

* * * * *

UNITED STATES PATENT AND TRADEMARK OFFICE
CERTIFICATE OF CORRECTION

PATENT NO. : 4,233,744
DATED : November 18, 1980
INVENTOR(S) : Mario POSSATI

It is certified that error appears in the above-identified patent and that said Letters Patent are hereby corrected as shown below:

correct the name of Assignee from "Finike Italiana Marposs S.p.A. S. Marino, Italy" to -- Finike Italiana Marposs S.p.A. S. Marino di Bentivoglio (BO), Italy --;

column 1, line 15, correct "indications" to -- indication --;

column 1, line 25, delete "a" before "positions";

column 2, line 55, correct "in", second occurrence, to -- pin --;

column 3, line 6, correct "FIG. 3" to -- FIG. 2 --;

column 5, line 37, correct "claims" to -- claim -- and insert a comma after reference "3";

column 6, line 46, correct "claim 3" to -- claim 9 --.

Signed and Sealed this

Seventh Day of April 1981

[SEAL]

Attest:

RENE D. TEGTMEYER

*Attesting Officer*   *Acting Commissioner of Patents and Trademarks*